United States Patent Office 2,694,552
Patented Nov. 16, 1954

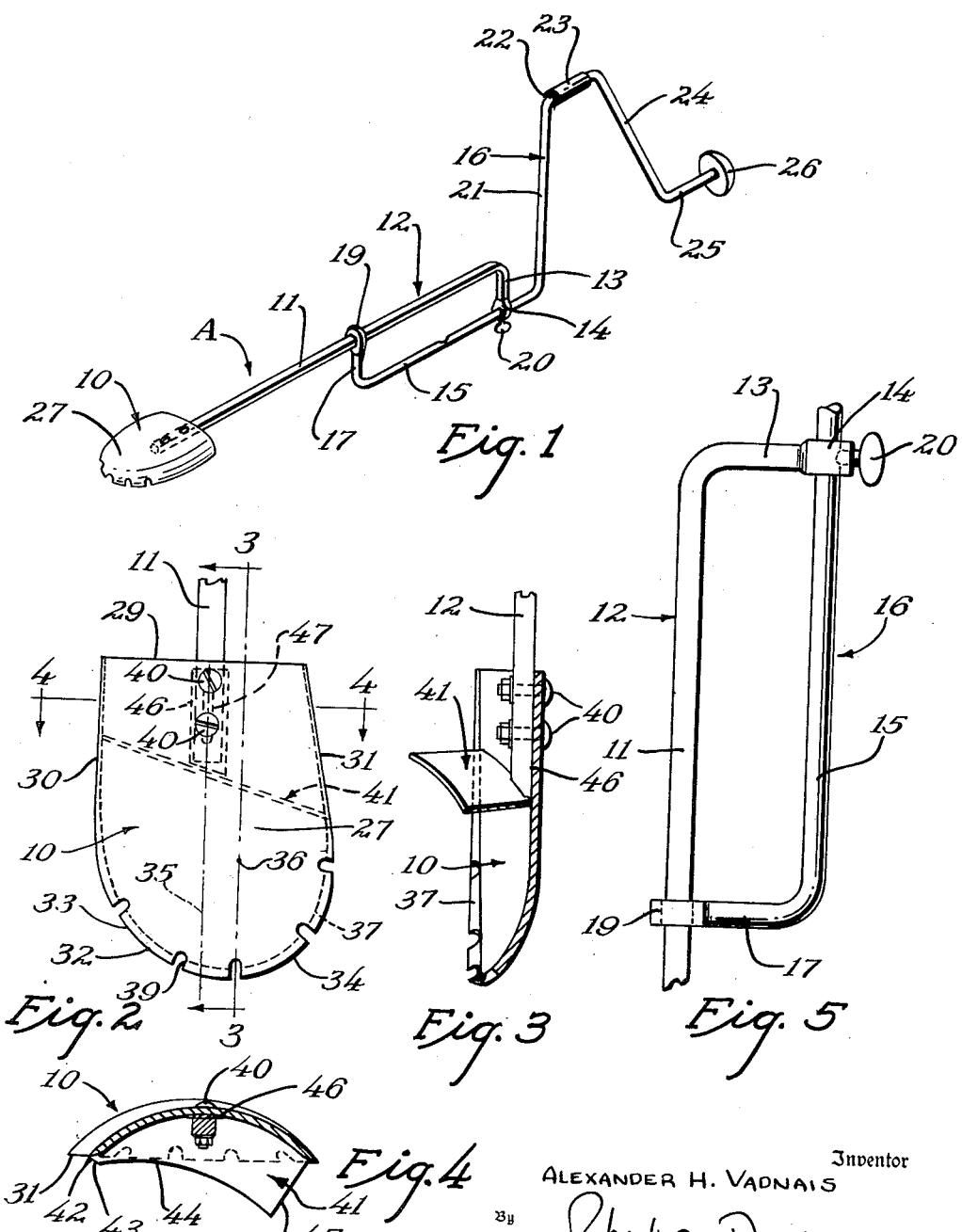

2,694,552

ICE-CUTTING TOOL

Alexander H. Vadnais, St. Paul, Minn.

Application September 9, 1950, Serial No. 183,990

7 Claims. (Cl. 255—61)

My invention relates to an improvement in ice drilling apparatus wherein it is desired to provide an inexpensive and effective apparatus for drilling through the ice.

Cutting holes through the ice for the purpose of ice fishing and the like is often a difficult and time consuming operation. Holes are usually cut with an ice chopping device which is rammed downwardly into the ice. As the ice is often relatively thick, difficulty is often experienced in removing the chips of ice from the hole and often a special tool is provided for this purpose. Furthermore, the holes cut in this way are usually rough and jagged by nature and cause serious injury to a fishing line inserted therethrough. Often times a fish will pull the line against one of the rough portions on the wall of the hole and will cause the line to be broken.

In my previously filed application Serial No. 86,170, filed April 8, 1949, I disclose an ice drilling apparatus capable of cutting a hole through the ice, leaving a smooth wall thereupon. The present invention lies in improvements in the previous construction, which make it even more effective in its operation.

A feature of the present invention lies in the provision of a concave cutting blade which is supported upon the end of an auger like structure. This structure is off-set between its ends so that the axis of rotation is near the center of curvature of the concave blade. As a result the blade may be rotated by turning the blade about approximately its center of curvature as it appears in horizontal section.

A feature of the present invention lies in the specific shape of the blade. The exact shape of the blade is of importance as one blade will easily cut through ice while a slightly different form of blade will not. An important feature of the invention resides in the fact that the blade is curved along a compound arc rather than about a single radius. The portion of the blade having the shorter radius of curvature forms the leading edge of the device and causes the blade to bite into the ice without vibrating or chattering as would otherwise take place. A part of the blade forming the leading edge at the lower end of the blade tends to bite into the ice as the apparatus is rotated, thus making the device easily operable in use.

A further feature of the present invention resides in the provision of a structure whereby the lower portion of the shank is reinforced. My ice cutting device is formed with a handle which is extensible and contractable in length. The upper handle portion includes a downwardly turned shank having an off-set end supporting a bearing through which the other handle portion extends. The lower handle portion includes an upwardly extending shank having an off-set end provided with a bearing through which the shank of the upper portion extends. Thus the shanks of the two portions extend parallel and are connected together at spaced points, thus reinforcing one another and preventing chattering of the operating handle.

An added feature of the present invention lies in the fact that the device is collapsible in length. In cutting through ice which may be from two to three feet in thickness, it is necessary to provide a tool which has a sufficiently long handle so that it may be readily used and at the same time may be carried in the trunk of a car. By arranging the handle in two parts as described and slidably connecting the two parts, this object may be accomplished.

A further feature of the present invention resides in the provision of an ice cutter tool having a concave cutting blade which is equipped with an inclined blade extending across the concave surface thereof. This cutting blade is inclined forwardly and downwardly toward the leading edge of the blade and is designed to engage into the ice chipped from the hole and to assist in urging the cutter blade downwardly. Thus as the blade is rotated the ice which has been chipped from the walls of the hole passes over the upper surface of the blade and tends to force the blade downwardly. At the same time the loose ice and snow within the hole tends to be forced upwardly by the blade. Not only is the blade driven downwardly by the weight or pressure of the loose ice and snow thereagainst, but also this ice and snow is broken up and maintained in a condition in which it may be readily removed from the hole.

An added feature of the present invention resides in the provision of a cutting tool having a concave cutting blade having an inclined blade of particular design mounted thereupon. This inclined blade fits against the inner concave surface of the blade and is relatively narrow at its leading edge tapering virtually to a point at the leading edge of the blade. The transverse blade increases in thickness toward the trailing edge of the cutting blade and is of maximum width near the rear edge of the blade as it rotates. Thus the transverse blade does not interfere with the rotation of the blade, but works its way into the loose ice and snow within the hole in a manner to assist the downward boring action of the tool.

These and other objects and novel features of my invention will be more clearly and fully set forth in the following specification and claims.

In the drawings forming a part of my specification:

Figure 1 is a perspective view of the apparatus in readiness for operation.

Figure 2 is a rear elevational view of the cutting end of the apparatus.

Figure 3 is a sectional view through the cutting tool, the position of the section being indicated by the line 3—3 of Figure 2.

Figure 4 is a cross-sectional view through the handle, the position of the section being indicated by the line 4—4 of Figure 2.

Figure 5 is a side elevational view of the center portion of the device showing the details of the connection between the two parts of the apparatus.

The ice cutting tool is indicated in general by the letter A. This tool includes a concave-convex cutting head 10 which is connected to the shank 11 of a lower handle portion 12. The lower handle portion 12 includes an off-set upper extremity 13 which extends at substantially right angles to the remainder of the body and is provided with a bearing 14 at its extremity.

The bearing 14 is designed to accommodate the shank 15 of the upper tool portion 16. The shank 15 is provided with an angularly turned end 17 provided with a bearing 19 at its extremity. The bearing 19 encircles the shank 11 while the bearing 14 encircles the shank 15. A set screw 20 in the bearing 14 may hold the two parts 12 and 16 in adjusted relationship.

The upper tool portion 16 is provided with a crank arm 21 connecting the shank 15 with a handle portion 22 parallel to the shank 15 and off-set therefrom. A tubular handle member 23 preferably encircles the handle portion 22 to simplify the rotation of the tool.

The handle portion 22 is connected by the crank arm 24 to an end portion 25 which is axially aligned with the shank 15. A head 26 is rotatably secured to the end 25. The member 26 may serve as a bearing portion to permit downward force to be exerted against the handle of the device. At the same time this head 26 may be grasped with one hand during rotation of the handle.

The cutting head 10 forms an important part of the present invention. Previous devices have been constructed and provided with concave heads having some similarity to that disclosed. However, these previous devices have not been notched peripherally and they have not been mounted similarly to the present construction.

As a result the previous devices have not fulfilled their intended purpose as well as the present device.

The head 10 is provided with a convex outer surface 27 having a substantially flat upper edge 29, downwardly extending sides 30 and 31 and a rounded lower edge 32. This rounded lower edge is formed along two different radii, the curved edge 33 adjoining the side edge 30 being curved along a greater radius than the curved edge portion 34 adjoining the side edge 31. Furthermore, the side edge 31 slants outwardly and downwardly at a greater angle from the vertical than the edge 30. Thus the curved edge portion 34 which forms the leading edge of the blade during its rotation is spaced a greater distance from the axis of the shank 11 than is the curved edge portion 33.

Observing Figure 2, for example, it will be noted that the line at which the handle portion 11 is connected is indicated by the broken line 35. It will be noted that the side edge 30 is generally parallel to the line 35 and that the center of curvature of the curved portion 33 is substantially to the right of the line 35, as viewed in Figure 2. At the same time it will be noted that the edge 31 curves downwardly and forwardly away from the line 35 and that the center of curvature of the curved portion 34 is also to the right of the line 35. This causes a digging action which will not take place effectively if the blade is the same on both sides of the line 35 and the deepest part of the blade, or the part farthest from the plane of the blade edges is near the point 36 which is spaced substantially from the line 35. The blade is sharpened about its periphery by grinding off a portion of the inner surface as indicated at 37. The outer surface of the blade is not ground off to any substantial extent so that the cutting edge of the blade is at the outer surface thereof. The rounded lower end 32 of the blade is provided with spaced notches 39, these notches greatly increasing the effectiveness of the structure. The entire edge of the blade is on substantially a common plane which inclines slightly to the axis of the handle, the concavity of the cutting head being greatest on a transverse line through approximately the point 36.

The handle shank 11 is connected to the cutting head 10 by bolts 40 or other suitable means. Thus the head may be removed or replaced if desired. However, with reasonable care, the tool will last indefinitely without replacement.

As indicated in Figures 2, 3, and 4 of the drawings an inclined transverse blade 41 may be attached to the concave or inner surface of the blade to assist its boring action. This blade 41 is preferably shaped as best illustrated in Figure 4 of the drawings. The blade 41 tapers to a point at its forward extremity 42, this forward extremity being located adjacent the leading edge 31 of the blade. The forward blade end tapers inwardly for a short distance as indicated at 43 and then gradually increases in width along a curved inner edge 44 as illustrated. The rear edge 45 of the blade extends substantially radially relative to the curvature of the outer surface of the blade. The outer blade surface is curved to fit the curvature of the concave inner surface of the head 10.

As best shown in Figure 2 of the drawings the blade 41 is provided with an angle bracket 46 extending upwardly along the inner surface of the head 10 between the shank 11 of the handle 12 and the surface of the blade. This bracket 46 is preferably slotted as indicated at 47 to accommodaete the screws or bolts 40 which hold the head 10 to the handle 12. Thus it will be noted that by loosening the bolt 40, the handle may be loosened sufficiently to permit the blade 41 to be inserted or removed.

In operation, as the head 10 is rotated in a counterclockwise direction as viewed in Figure 4, the pointed end of the blade 41 extends into the loose ice and snow within the hole and tends to urge the head downwardly. The downward pressure of the ice and snow against this blade assists materially in forcing the tool down into the ice so that the blade may be rotated without excessive downward pressure.

The collapsibility of the handle permits the tool to be carried in the trunk of an automobile and also permits the handle to be shortened during the start of the drilling operation or during the drilling operation through relatively thin ice. However, the handle may be extended for drilling deeper holes and this arrangement permits a hole of substantial depth to be drilled without difficulty.

In the operation of the apparatus the head 10 is placed upon the ice and the device is rotated about substantially the axis of the handle shank 15. This causes the head to travel in a circular path about the axis of the shank 15, thus drilling a hole several inches in diameter. The leading edge of the blade being off-set forwardly beyond the normal circumference of the aperture being drilled tends to bite into the ice and cause the head to cut steadily rather than to chatter or vibrate. The rear edge of the blade tends to hold the blade at a predetermined diameter, while the leading edge tends to dig into the ice and increase the diameter of the hole being drilled. As a result the blade cuts uniformly into the ice and tends to move the tool downwardly into the hole as it cuts.

The entire device is shaped somewhat similarly to the end of a shovel and therefore the chipped ice may from time to time be removed from the hole. The handle of the tool may be elongated when desired to simplify the cutting operation.

The shape of the tool head is quite critical and the provision of teeth in the head also forms an important feature in this particular combination. Considerable experimental work with tools of the type in question indicates that if the head is not formed in substantially the manner illustrated, the blade tends to cut into the ice and then to slip out of the hole being cut, thus producing a chattering or vibrating action in the handle which makes it difficult to operate and hard to control. Similarly the off-setting of the handle shank 15 from the shank 11 makes it possible to rotate the head about substantially the center of rotation of the shank 15, thus greatly decreasing the force necessary to rotate the device. As the handle extends straight upwardly from the cutting head, the operator tends to rotate the head from a point substantially spaced from the axis of the hole to be cut, thereby greatly increasing the force necessary to rotate the head.

In accordance with the patent statutes, I have described the principles of construction and operation of my ice cutting tool, and while I have endeavored to set forth the best embodiment thereof, I desire to have it understood that obvious changes may be made within the scope of the following claims without departing from the spirit of my invention.

I claim:

1. An ice cutting tool including a cutting head of concavo-convex form, designed for rotation in one direction, a handle extending upwardly from said head by means of which said head may be rotated, said head having a peripheral cutting edge of generally U-shaped form, with generally vertical side edges and a rounded bottom edge, that portion of the rounded edge on the leading side of the head during rotation in said one direction being spaced a greater distance from the axis of the handle than is the trailing edge portion of the rounded edge, said portion of the rounded bottom edge on the leading side of the head being of relatively short radius of curvature and the trailing edge portion of the cutting edge being of greater radius.

2. The structure described in claim 1 and including peripheral teeth on said head.

3. An ice cutting tool including a cutting head of concavo-convex form, designed for rotation in one direction, a handle extending upwardly from said head by means of which said head may be rotated, said head having a peripheral cutting edge of generally U-shaped form, with generally vertical side edges and a rounded bottom edge, that portion of the rounded edge on the leading side of the head during rotation in said one direction being spaced a greater distance from the axis of the handle than is the trailing edge portion of the rounded edge, said portion of the rounded bottom edge on the leading side of the head being of relatively short radius of curvature and the trailing edge portion of the cutting edge being of greater radius, said handle having a crank arm by means of which the head may be rotated.

4. An ice cutting tool including a concavo-convex head having a rounded lower edge, a handle secured to said head and extending upwardly therefrom, said handle having an off-set upper end section extending angularly to the remainder of the handle in a direction forwardly from the concave surface of the head and terminating in a bearing arranged with its axis near the center of the concave surface of the head, a second handle portion including a shank extending through said bearing and extending substantially parallel to the first named handle, said second handle portion having an angularly extending end supporting a bearing encircling said first named handle, means on said second handle portion by which the same may be rotated, and means for holding said handle portions in adjusted position.

5. The structure described in claim 4 and in which the blade is provided with a U-shaped edge including generally vertical sides and a rounded lower portion, the blade being designed for rotation in one direction, a portion of the leading edge during said rotation, being farther from the axis of the handle than the corresponding portions of the trailing edge, the leading edge portion of the rounded lower portion being of relatively shorter radius than the trailing edge portion of the rounded lower portion.

6. An ice cutting tool including a cutting head of concavo-convex form, a handle extending upwardly from said head by means of which said head may be rotated, a leading cutting edge on said head, and an inclined transverse blade secured to the concave surface of the head and extending inwardly therefrom, said blade being inclined forwardly and downwardly with its forward end adjacent the leading edge of the blade, the blade gradually increasing in thickness toward the rear edge of the blade, and said blade having inner and outer curved edges, the outer edge thereof being shaped to fit the curvature of the concave surface of the head.

7. An ice cutting tool including a cutting head of concavo-convex form, a handle extending upwardly from said head by means of which said head may be rotated, a leading cutting edge on said head, and an inclined transverse blade secured to the concave surface of the head and extending inwardly therefrom, said transverse blade constituting a flat plate tapering to a point at its leading edge which edge is located adjacent the leading edge of the head.

References Cited in the file of this patent

UNITED STATES PATENTS

| Number | Name | Date |
|---|---|---|
| 598,856 | Carter et al. | Feb. 8, 1898 |
| 2,043,218 | Anderson | June 9, 1936 |
| 2,057,365 | Carlson | Oct. 13, 1936 |
| 2,504,188 | Eberhardt | Apr. 18, 1950 |
| 2,508,230 | Coon | May 16, 1950 |